(12) United States Patent
Hasbani

(10) Patent No.: US 6,371,542 B1
(45) Date of Patent: Apr. 16, 2002

(54) LOAD LIFTING ACCESSORY

(76) Inventor: Hossam Milad Hasbani, 2300 Confederation Parkway Apartment #510, Missisauga, Ontario (CA), L5B 1R5

( * ) Notice: Subject to any disclaimer, the term of this patent is extended or adjusted under 35 U.S.C. 154(b) by 0 days.

(21) Appl. No.: 09/811,479

(22) Filed: Mar. 20, 2001

(51) Int. Cl.[7] ................................................. A01B 1/02
(52) U.S. Cl. .................................... 294/59; 254/131.5
(58) Field of Search ..................... 294/49, 54.5, 58–60; 254/131.5, 132

(56) References Cited

U.S. PATENT DOCUMENTS

| | | | |
|---|---|---|---|
| 2,434,074 A | * | 1/1948 | Jeffers ...................... 254/131.5 |
| 2,769,612 A | * | 11/1956 | Weisheit ...................... 294/59 |
| 3,035,816 A | | 5/1962 | Conant |
| 3,119,596 A | | 1/1964 | Pratt |
| 4,130,953 A | | 12/1978 | Bruno |
| 4,198,090 A | | 4/1980 | Gutman |
| 4,537,433 A | | 8/1985 | Yang |
| 4,722,512 A | | 2/1988 | Lighthizer |
| 4,881,332 A | | 11/1989 | Evertsen |
| 5,487,530 A | | 1/1996 | McCullough |
| 5,669,651 A | | 9/1997 | Vroegindewey |
| 5,732,933 A | | 3/1998 | Champi |
| 5,863,084 A | | 1/1999 | Krug |
| 5,918,921 A | | 7/1999 | Samuelson |
| 6,086,049 A | * | 7/2000 | Sheils ......................... 294/59 |
| 6,203,801 B1 | * | 3/2001 | Kegan, Sr. .................. 294/59 |

* cited by examiner

Primary Examiner—Dean J. Kramer
(74) Attorney, Agent, or Firm—Marks & Clerk

(57) ABSTRACT

A load lifting accessory may be provided which is adapted to be affixed to the shaft of a shovel. The load lifting accessory comprises a bracket, a support arm, an extension member and a retractor arm. The bracket, which has a support arm pivotally attached thereto, is adapted to embrace the underside of the shaft of the shovel when the shovel is oriented in a normal shovelling position. The first end of the retractor arm is pivotally and slidably attached to the first end of the extension member, whereas the second end of the retractor arm is pivotally attached to one of the first and second side edges of the support arm. In an alternative embodiment, an actuator is used instead of an extension member. The purpose of the load lifting accessory is to relieve the user of severe vertebral and back muscle strains which are associated with shovelling.

15 Claims, 4 Drawing Sheets

LOAD LIFTING ACCESSORY

FIELD OF THE INVENTION

This invention relates to load lifting accessories, and particularly relates to load lifting accessories which are used with manual shovels for handling heavy loads such as snow, sand and soil. The load lifting accessory of the present invention is designed in such a manner that when it is in use with the manual shovel, the user is relieved of severe vertebral and back muscle strains which are associated with shovelling heavy loads. Furthermore, the load lifting accessory of the present invention is such that it may be easily removably attached to the shaft of the manual shovel so as to provide the user the flexibility to transfer the load lifting accessory to the shaft of any conventional manual shovel.

BACKGROUND OF THE INVENTION

Shovelling heavy loads such as snow, sand and soil has been one of the leading causes of back strain injuries. In fact, gardeners and other individuals who are required to shovel heavy loads on the job are reported to be the most susceptible victims to such injuries. For many others, shovelling snow throughout the winter months often results in vertebral and muscle strains.

Indeed, shovelling snow has been compared to weight-lifting by some kinesiologists. It requires a lot of exertion and it is a multi-joint movement exercise. A variety of muscles are used during the activity, both large and small muscles-large muscles such as leg muscles and small muscles such as those found in the region of the lower back. The small muscles are particularly prone to strain injuries because these small muscle groups are not used as often as the large leg muscles. For those persons who are naturally weak or for those who don't usually get much exercise, shovelling heavy loads may be a health risk.

A conventional manual shovel is, in fact, not a very efficient tool to lift heavy loads since a relatively large effort needs to be exerted by the user to overcome the resistance of each load. Generally, the user grips the shaft of the shovel with one hand at a point which is relatively low along the length of the shaft, and uses his other hand to effectively lever the shaft about that point. A conventional manual shovel is a typical example of a third class lever. The effort is applied by the one hand which is positioned near the load, and the fulcrum is situated at the other hand which is distal from the blade of the shovel. Physiologically, the spinal vertebrae and the associated back muscles act as a cantilever to resist the weight of the load in each shovelling motion. Since the back of the user is typically bent forward to load and lift the shovel, the whole weight of his torso, shoulders, arms and head adds additional strain to his back. The spine is stressed in compression and the muscles in tension to resist the bending of the back, and thus often leads to fatigue, soreness, and injuries.

Although powered shovels may be employed as an alternative, they are considered to be too expensive for many consumers. Furthermore, most powered shovels are difficult for storage and are not portable. In areas where access is limited, shovelling with a powered shovel may also pose difficulties since most powered shovels are bulky and heavy to manoeuver.

The present inventor herein has provided a load lifting accessory which is adapted to be affixed to the shaft of a conventional manual shovel. The load lifting accessory of the present invention is simple, economical, portable, light-weight and compact. In addition, the load lifting accessory of the present invention is such that it may be easily removably attached to the shaft of the manual shovel so as to provide the user the flexibility to transfer the load lifting accessory to the shaft of any conventional manual shovel. Most importantly, the load lifting accessory of the present invention is designed in such a manner that when it is in use with the manual shovel, the user is relieved of severe vertebral and back muscle strains which are associated with shovelling heavy loads.

The load lifting accessory of the present invention generally comprises a bracket, a support arm and a retractor arm. The bracket is adapted to embrace the underside of the shaft of the shovel when the shovel is oriented in a normal shovelling position in such a manner that the region of the midpoint of the underside of the shaft of the shovel is rested against the inner surface of the bracket. The support arm is attached to the outer surface of the bracket by attachment means which permits pivotal movement of the support arm. When the shovel is in a non-operative position, the support arm is contiguous to the outer surface of the bracket. However, when the shovel is in an operative position, the support arm extends substantially vertically downwardly from the bracket to the ground.

When the load lifting accessory of the present invention is affixed to the shaft of the shovel, the conventional shovel becomes a first class lever, thus making the accessorized conventional shovel substantially more effective in overcoming large resistance since a relatively small effort is required for the operation of a first class lever. Here, the support arm of the load lifting accessory of the present invention operates as the fulcrum while the effort is applied by both hands of the user. Normally, lifting forces are applied by the user to the shaft of the conventional shovel having no load lifting accessory. However, with the implementation of the load lifting accessory to the conventional shovel, lifting forces are no longer required. Instead, the user needs only to apply downward forces to the shaft of the shovel since the support arm of the load lifting accessory provides the necessary upward lifting forces. To that end, the user may easily shovel heavy loads without bending his back, thus greatly reducing the usual spinal and back muscle strains and stresses.

DESCRIPTION OF THE PRIOR ART

Several prior art patents are noted, which relate particularly to shovelling tools and the like utilizing fulcrum type aids. They include the following:

BRUNO U.S. Pat. No. 4,130,953 issued Dec. 26, 1978;
KRUG U.S. Pat. No. 5,863,084 issued Jan. 26, 1999;
YANG U.S. Pat. No. 4,537,433 issued Aug. 27, 1985;
VROEGINDEWEY U.S. Pat. No. 5,669,651 issued Sep. 23, 1997;
LIGHTHIZER U.S. Pat. No. 4,722,512 issued Feb. 2, 1988;
PRATT U.S. Pat. No. 3,119,596 issued Jan. 28, 1964; and
CONANT U.S. Pat. No. 3,035,816 issued May 22, 1962.

Several other patents which relate more to the load lifting accessory, include the following:

EVERTSEN U.S. Pat. No. 4,881,332 issued Nov. 21, 1989 teaches an elongate, ground contacting member which is pivotally attached to an intermediate point along the handle of the shovel or similar tools. The elongate, ground contacting member has attachment means which permits rotation of the ground contacting member about its own axis. When the shovel is loaded, it is raised to the hip level of the user by drawing back and lowering the end of the handle opposite the shovel head while the ground contacting member acts as a fulcrum between the load and the user's applied force. The shovel head is then permitted to move sideways to deposit the load where desired. There are no means to stabilize the uncontrolled swinging of the elongate, ground contacting member when it is extended to the ground, and furthermore the device taught in this patent is not readily detachable from the primary tool.

In U.S. Pat. No. 4,198,090 issued Apr. 15, 1980 to GUTMAN, the inventor has provided a shovel which utilizes an adjustable type fulcrum member in combination with an adjustable hand gripping member for purposes of easing the shovelling of a load. The adjustable lever mechanism is releasably secured and movably displaceable in a direction substantially normal to the shaft of the shovel so as to provide an adjustable height above a base surface when the blade of the shovel is in contact with the base surface. The adjustable grip mechanism is releasably secured and movably displaceable with respect to the shaft and extends above such a shaft so as to provide the user with a secondary gripping portion.

In another U.S. Pat. No. 5,487,530 issued Jan. 30, 1996, the inventor McCULLOUGH teaches a shovelling aid which comprises an elongated bracing member wherein the elongated bracing member is releasably attachable to the shaft of the shovel at a selected position away from the blade of the shovel. The bracing member comprises a pipe section which has upper and lower openings on opposed sides. A sleeve which is coupled to the pipe section in the upper openings receives the shaft of the shovel at a predetermined angle relative to the pipe section.

U.S. Pat. No. 5,732,933 issued Mar. 31, 1998 to CHAMPI teaches a lifting implement for a conventional snow shovel or like tools. The lifting implement comprises an elongate lever arm having first and second ends. The first end of the lever arm is pivotally attached to the shovel handle while the second end of the lever arm terminates in a curved fork and spans by a foot-engaging cross-bar. The curved fork serves as the fulcrum for the application of downward foot pressure by the user on the cross-bar.

Finally, SAMUELSON U.S. Pat. No. 5,918,921 issued Jul. 6, 1999 teaches a levered shovel for moving snow which comprises a wheel assembly for contacting a horizontal surface and wherein the wheel assembly depends from the shaft of the shovel. The wheel assembly comprises either an axle fork, an axle rotatively mounted to the axle fork, and a pair of wheels attached to the axle or an inverted T-shaped member with its transverse portion serving as its axle to which a pair of wheels are rotatively attached. Furthermore, the shaft of the shovel comprises a hand assembly which is disposed on the end of the shaft distal from the blade. The handle assembly has a lower transverse member for gripping and extends laterally from both sides of the rearmost end of the shaft. Additionally, the hand assembly includes an extender which elevates the gripping point of the user on the handle such that the user may maintain a relatively upright posture.

SUMMARY OF THE INVENTION

In a first general embodiment, the present invention provides a load lifting accessory which is adapted to be affixed to the shaft of a shovel. The load lifting accessory of the present invention comprises a bracket, a support arm, an extension member and a retractor arm.

The bracket has inner and outer surfaces, first and second ends, and first and second side edges.

The bracket is adapted to embrace the underside of the shaft of a shovel when the shovel is oriented in a normal shovelling position, and is such that the underside of the shaft of the shovel, in the region of the midpoint thereof, is rested against the inner surface of the bracket.

Furthermore, the bracket is attached to the shaft of the shovel by attachment means. Still further, the outer surface of the bracket has a support arm attached thereto by attachment means which permits pivotal movement of the support arm.

The support arm has top and bottom ends, and first and second side edges.

When the support arm is in a first, non-operative position, the support arm is contiguous to the outer surface of the bracket at the second end. However, when the support arm is in a second, operative position, the support arm extends substantially vertically downwardly from the bracket to the ground.

The extension member has first and second ends. The second end of the extension member is secured against the outer surface of the bracket in the region of one of the first and second side edges.

The retractor arm has first and second ends. The first end of the retractor arm is pivotally and slidably attached to the first end of the extension member whereas the second end of the retractor arm is pivotally attached to one of the first and second side edges of the support arm at a point which is intermediate the first and second ends thereof.

Typically, the bracket has a U-shaped cross section so as to embrace the underside of a cylindrical shaft of a shovel.

The bracket is attached to the shaft of the shovel by attachment means which is chosen from the group of attachment means consisting of clamps, straps and buckles, and bolts.

In keeping with the present invention, the first end of the retractor arm is pivotally and slidably attached to the first end of the extension member by a pivotal means which has a passage formed therein so as to permit the retractor arm to extend therethrough.

Typically, but not necessarily, the support arm is formed from materials chosen from the group of materials consisting of wood, metals and plastics.

The support arm has two portions in which the two portions are telescopically fitted one over the other so as to permit the length of the support arm to be adjusted.

In a particular variation, the support arm is offset forwardly.

Typically, but not necessarily, the load lifting accessory which is described above may further comprise a foot member. The foot member is removably attached to the bottom end of the support arm.

In a second general embodiment of the present invention, there is provided a load lifting accessory which is adapted to be affixed to the shaft of a shovel. The second embodiment of the load lifting accessory of the present invention comprises a bracket, a support arm, an actuator, and a retractor arm.

The bracket has inner and outer surfaces, first and second ends, and first and second side edges.

When the shovel is oriented in a normal shovelling position, the bracket is adapted to embrace the underside of the shaft of the shovel in such a manner that the underside of the shaft of the shovel, in the region of the midpoint thereof, is rested against the inner surface of the bracket.

The bracket is attached to the shaft of the shovel by attachment means. Furthermore, the outer surface of the bracket has a support arm attached thereto by attachment means which permits pivotal movement of the support arm.

The support arm has top and bottom ends, and first and second side edges.

When the support arm is in a first, non-operative position, the support arm is contiguous to the outer surface of the bracket at the second end. However, when the support arm is in a second, operative position, the support arm extends substantially vertically downwardly from the bracket to the ground.

The actuator has first and second ends, and first and second sides at the same side of the load lifting accessory as the first and second side edges of the support arm.

The first end of the actuator is pivotally attached to the outer surface of the bracket, in the region between the first end of the bracket and the attachment point of the support arm.

The retractor arm has first and second ends. The first end of the retractor arm is pivotally attached to one of the first and second sides of the actuator, in the region between the first end and the midpoint thereof, whereas the second end of the retractor arm is pivotally attached to one of the respective first and second side edges of the support arm at a point which is intermediate the first and second ends thereof.

Typically, the bracket has a U-shaped cross section so as to embrace the underside of a cylindrical shaft of a shovel.

The bracket is attached to the shaft of the shovel by attachment means chosen from the group of attachment means consisting of clamps, straps and buckles, and bolts.

Typically, but not necessarily, the support arm is formed from materials chosen from the group of materials consisting of wood, metals and plastics.

The support arm has two portions and is such that the two portions are telescopically fitted one over the other so as to permit the length of the support arm to be adjusted.

In a particular variation of the second embodiment, the support arm is offset forwardly.

In keeping with the present invention, the load lifting accessory may further comprise a foot member. The foot member is removably attached to the bottom end of the support arm.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

As noted above, a feature of the present invention is essentially to provide a load lifting accessory which is adapted to be affixed to the shaft of a conventional manual shovel for handling heavy loads such as snow, sand and soil. The load lifting accessory of the present invention is designed in such a manner that when it is in use with the manual shovel, the user is relieved of severe vertebral and back muscle strains which are associated with shovelling heavy loads. Furthermore, the load lifting accessory of the present invention is such that it may be easily removably attached to the shaft of the manual shovel so as to provide the user the flexibility to transfer the load lifting accessory to the shaft of any conventional existing shovel.

Figure 1:
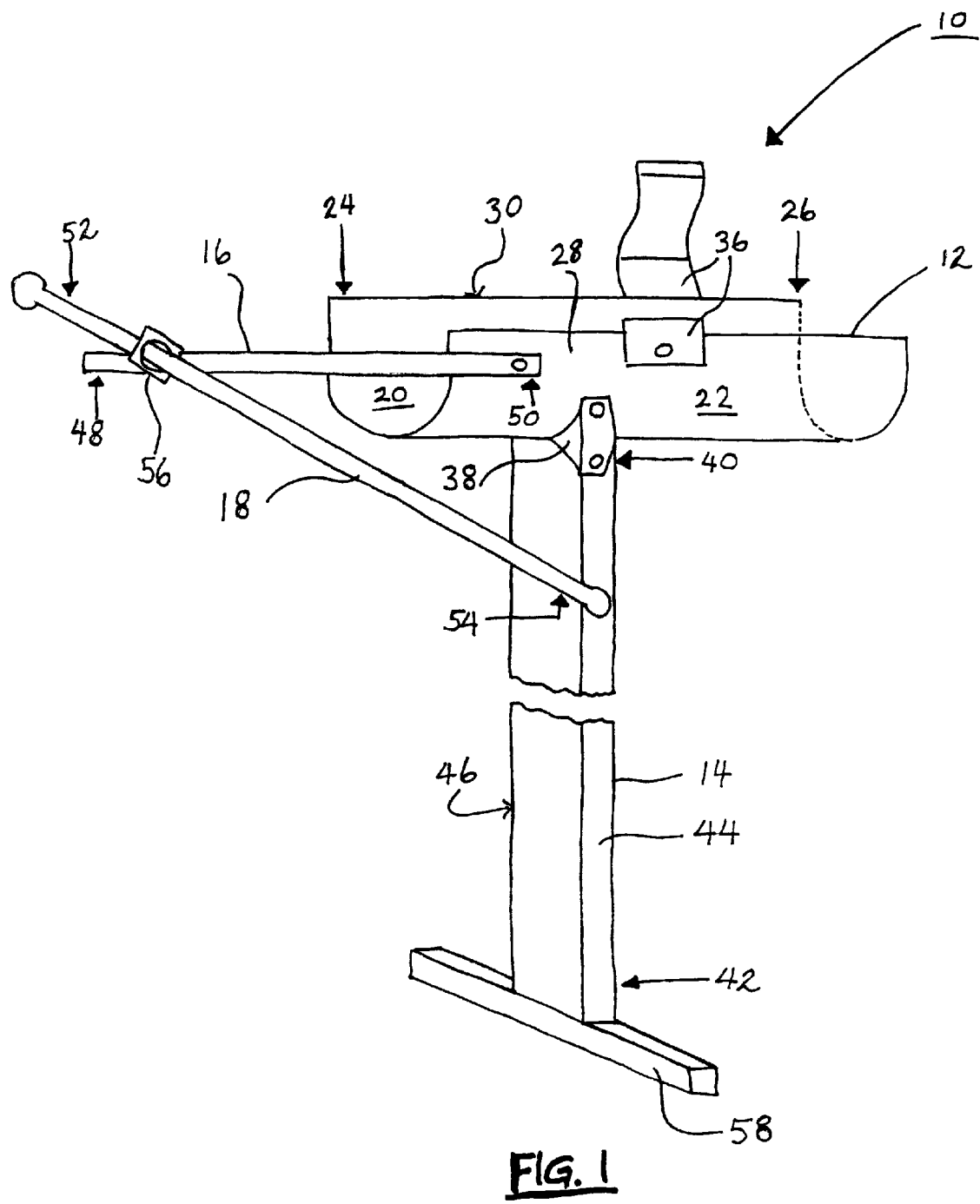
FIG. 1 is a perspective view of a first embodiment of the load lifting accessory in keeping with the present invention.
Figure 2:
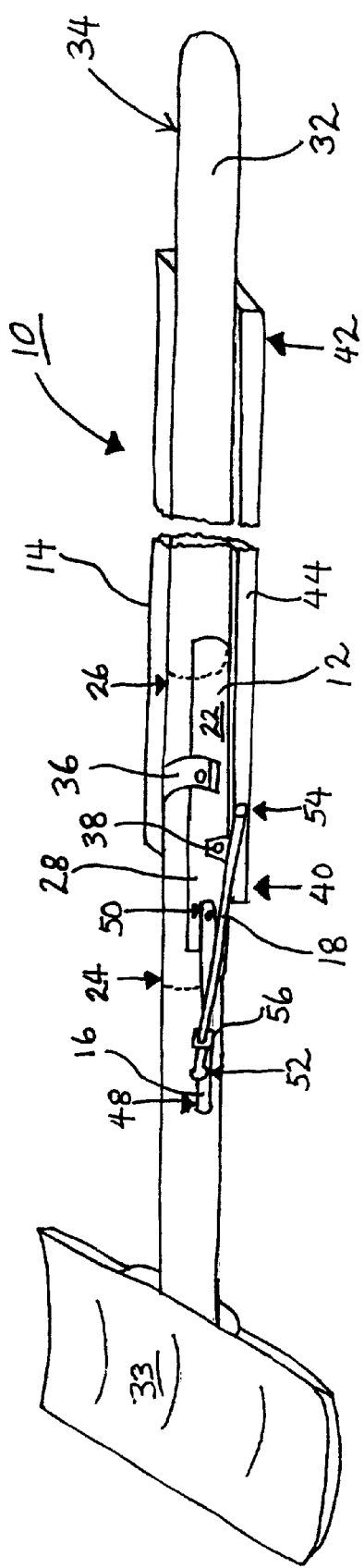
FIG. 2 is a perspective view of a first embodiment of the load lifting accessory in keeping with the present invention, when affixed to the shaft of a shovel.

Turning first to FIGS. 1 and 2, perspective views of the load lifting accessory 10 is shown. The load lifting accessory 10 comprises a bracket 12, a support arm 14, an extension member 16, and a retractor arm 18.

The bracket 12 has inner and outer surfaces, 20 and 22 respectively, first and second ends 24 and 26, and first and second side edges 28 and 30.

The bracket 12 is adapted to embrace the underside of the shaft 32 of a shovel 34 when the shovel 34 is oriented in a normal shovelling position and is such that the underside of the shaft 32 of the shovel 34, in the region of the midpoint thereof, is rested against the inner surface 20 of the bracket 12, as can be seen particularly in FIG. 2.

The bracket 12 is attached to the shaft 32 of the shovel 34 by attachment means 36. Furthermore, the outer surface 22 of the bracket 12 has a support arm 14 attached thereto by attachment means 38 which permits pivotal movement of the support arm 14.

The support arm 14 has top and bottom ends, 40 and 42 respectively, and first and second side edges 44 and 46. As particularly suggested by FIG. 2, the load lifting accessory 10 is easily stored. When the support arm 14 is in a first, non-operative position, the support arm 14 is contiguous to the outer surface 22 of the bracket 12 at the second end 26. However, when the support arm 14 is in a second, operative position (best seen in FIG. 1), the support arm 14 extends substantially vertically downwardly from the bracket 12 to the ground. It is noted that even when the support arm 14 is in a fully open second, operative position, the support arm 14 is not pivoted more than 120° from the shaft 32 of the shovel 34.

The extension member 16 has first and second ends, 48 and 50 respectively. The second end 50 of the extension member 16 is secured against the outer surface 22 of the bracket 12 in the region of one of the first and second side edges, 28 and 30 respectively.

The retractor arm 18 has first and second ends, 52 and 54 respectively. The first end 52 of the retractor arm 18 is pivotally and slidably attached to the first end 48 of the extension member 16 whereas the second end 54 of the retractor arm 18 is pivotally attached to one of the first and second side edges 44 and 46 of the support arm 14 at a point which is intermediate the first and second ends 40 and 42 thereof.

With reference to FIG. 2, the bracket 12 has a U-shaped cross section so as to embrace the underside of a cylindrical shaft 32 of a shovel 34.

The bracket 12 is attached to the shaft 32 of the shovel 34 by attachment means, which are represented by reference numeral 36. The attachment means 36 may be affixed at any point along the shaft 32 of the shovel 34. For most users, attachment of the bracket 12 to the underside of the shaft 32 of the shovel 34 at a distance from the blade 33 of about one-half the length of the shaft 32 has proven effective. The attachment means 36 may be clamps. Other attachment means 36 may be used are straps and buckles, and bolts.

In keeping with the present invention, the first end 52 of the retractor arm 18 is pivotally and slidably attached to the first end 48 of the extension member 16 by a pivotal means 56 which has a passage formed therein so as to permit the retractor arm 18 to extend therethrough.

The support arm 14 is preferably manufactured principally of a strong and light weight material. The support arm 14 may be formed from materials chosen from the group of materials consisting of wood, metals and plastics.

Furthermore, the support arm 14 is preferably adjustable in length such that the user has the flexibility to extend the support arm 14 to a desire height above the ground and that he may maintain his body substantially upright throughout the shovelling operation. As can be seen particularly in FIGS. 3 and 4, the support arm 14 has two portions 14a and 14b. The two portions 14a and 14b are arranged in such a manner that support arm portion 14a is telescopically fitted over support arm portion 14b so as to permit the length of the support arm 14 to be adjusted.

Typically, but not necessarily, the support arm 14 is offset forwardly so as to provide the user greater stability of the shovel 34 when the shovel 34 is loaded with a heavy load.

It is seen in FIG. 1 that the load lifting accessory 10 may further comprise a foot member 58 which is removably attached to the bottom end 42 of the support arm 14. The foot member 58 simply justifies any occasional need for stabilization during the shovelling operation.

Figure 3:
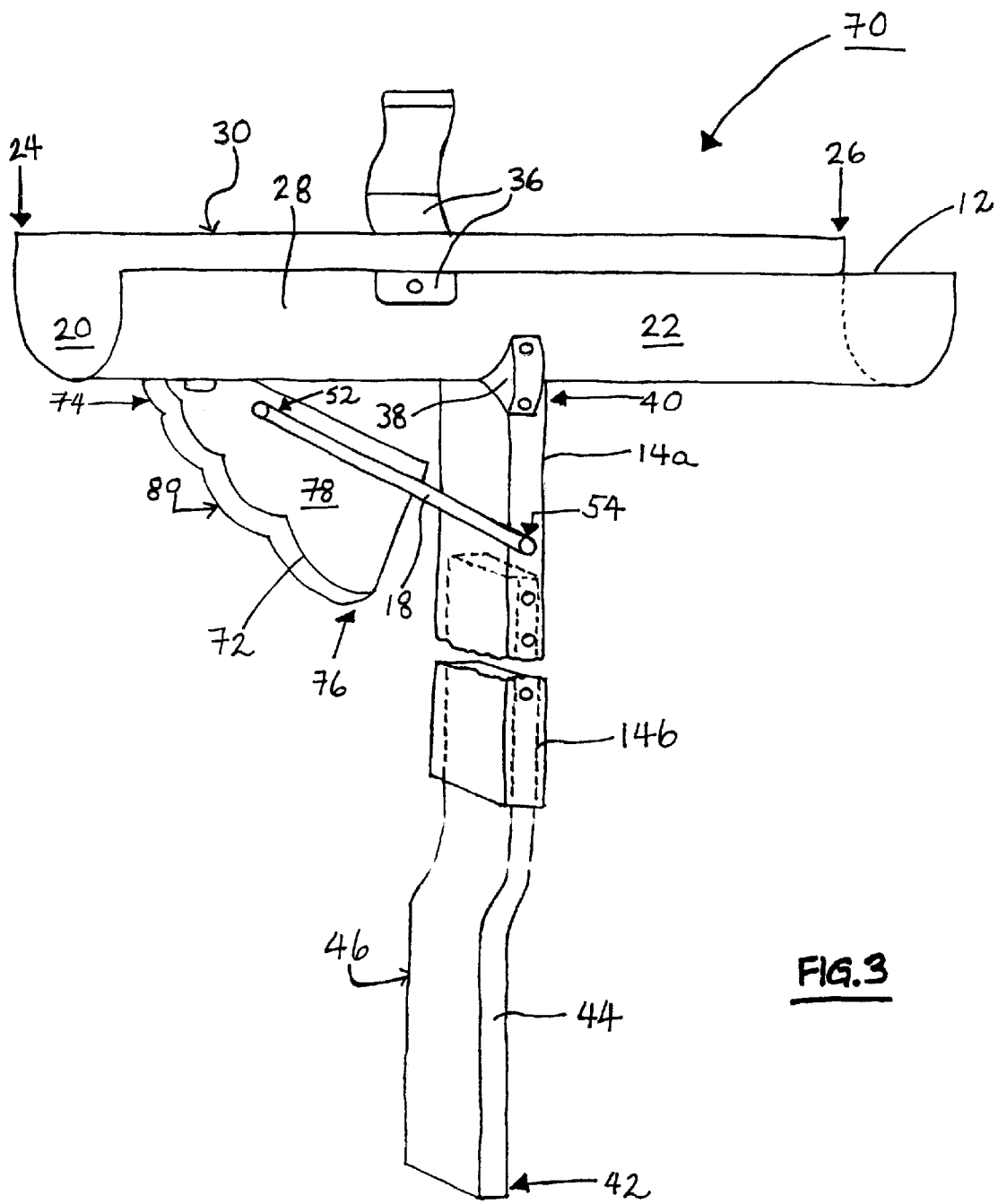
FIG. 3 is a perspective view of a second embodiment of the load lifting accessory in keeping with the present invention.
Figure 4:
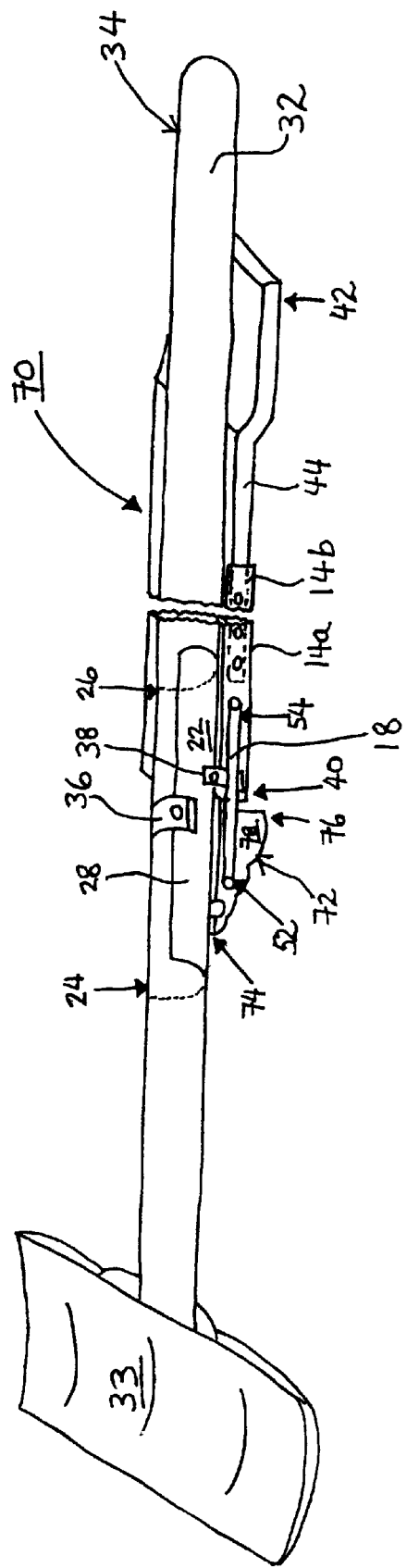
FIG. 4 is a perspective view of a second embodiment of the load lifting accessory in keeping with the present invention, when affixed to the shaft of a shovel.

Referring now to FIGS. 3 and 4, the load lifting accessory 70 comprises a bracket 12, a support arm 14, an actuator 72 and a retractor arm 18. The load lifting accessory 70 is adapted to be affixed to the shaft 32 of a shovel 34 in such a manner the bracket 12 is adapted to embrace the underside of the shaft 32 of the shovel 34 when the shovel is oriented in a normal shovelling position, as particularly suggested by FIG. 4. The underside of the shaft 32 of the shovel 34, in the region of the midpoint thereof, is thus rested against the inner surface 20 of the bracket 12.

The load lifting accessory 70 has the same structural configurations as the load lifting accessory 10 which was described above with the exception that load lifting accessory 70 has an actuator 72 instead of an extension arm 16 as was shown in FIGS. 1 and 2. With reference to FIGS. 3 and 4, the actuator 72 has first and second ends, 74 and 76 respectively, and first and second sides 78 and 80 at the same side of the load lifting accessory 70 as the first and second side edges 44 and 46 of the support arm 14. The first end 74 of the actuator 72 is pivotally attached to the outer surface 22 of the bracket 12, in the region between the first end 24 of the bracket 12 and the attachment point 38 of the support arm 14.

It is important to note that with the presence of the actuator 72, the attachment points of the retractor arm 18 of the load lifting accessory 70 is slightly different from the load lifting accessory 10. As seen in FIGS. 3 and 4, the first end 52 of the retractor arm 18 is pivotally attached to one of the first and second sides 78 and 80 of the actuator 72, in the region between the first end 74 and the midpoint point thereof, whereas the second end 54 of the retractor arm 18 is pivotally attached to one of the respective first and second side edges 44 and 46 of the support arm 14 at a point which is intermediate the first and second ends 40 and 42 thereof.

In operating the load lifting accessory 10 of the present invention when it is adapted to be affixed to the shaft 32 of the shovel 34, the user first withdraws the support arm 14 from its first, non-operative position and allows the support arm 14 to extend substantially vertically downwardly to the ground. The user then holds the extended retractor arm 18 with one hand, and places his other hand on and near the free end of the shaft 32 of the shovel 34. In the conventional manner, the user loads the materials onto the blade 33 of the shovel 34 by thrusting the blade 33 of the shovel 34 into the materials to be loaded. To initiate the lifting action, the user stands substantially upright and places one foot forwardly to stabilize the bottom end 42 of the support arm 14 while at the same time, draws the shaft 32 of the shovel 34 towards his body. The combined effects of these actions allows the user to lift the load onto the shovel 34 effortlessly and in a controlled fashion without bending his back forward, thus reducing any vertebral or back muscles strain. As the load is lifted, it passes vertically over and slightly passed the fulcrum which is defined by the support arm 14, and settles into a secure and fully supported resting position. At this point, the user grasps the retractor arm 18 to return the support arm 14 into a first, non-operative position and then the user may dispose the load. Drawing the retractor arm 18 towards the shaft 32 of the shovel 34 ensures that the support arm 14 is not an encumberment during the load throwing action. The operation of the load lifting accessory 70 is the same as was described for load lifting accessory 10.

The operation of the load lifting accessory 70 is similar to the operation of the load lifting accessory 10 which was described above. The user first withdraws the support arm 14 from its first, non-operative position to allow the support arm 14 to extend substantially vertically downwardly to the ground. However, rather than holding the extended retractor arm 18 as was seen in the operation of the load lifting accessory 10, the user herein grasps the actuator 72 with one hand, and places his other hand on and near the free end of the shaft 32 of the shovel 34. The actuator 72 controls the pivotal movement of the retractor arm 18 and operates together with the retractor arm 18. The actuator 72 may be ergonomically designed to provide the user complete comfort during the shovelling operation. In the conventional manner, the user then loads the materials onto the blade 33 of the shovel 34 by thrusting the blade 33 of the shovel 34 into the materials to be loaded. By stabilizing the bottom end 42 of the support arm 14, the user draws the shaft 32 of the shovel 34 towards his body to initiate the lifting action. Finally, the user grasps the actuator 72 to return the support arm 14 into a first, non-operative position and then the load may be disposed.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element.

Moreover, use of the terms "he", "him", or "his", is not intended to be specifically directed to persons of the masculine gender, and could easily be read as "she", "her", or "hers", respectively.

What is claimed is:

1. A load lifting accessory which is adapted to be affixed to the shaft of a shovel, said load lifting accessory comprising:
   a bracket, a support arm, an extension member, and a retractor arm;
      wherein said bracket has inner and outer surfaces, first and second ends, and first and second side edges;
      wherein said bracket is adapted to embrace the underside of the shaft of a shovel when the shovel is oriented in a normal shovelling position, and wherein the underside of the shaft of the shovel, in the region of the midpoint thereof, is rested against said inner surface of said bracket;
      wherein said bracket is attached to the shaft of the shovel by attachment means, and wherein said outer surface of said bracket has said support arm attached thereto by attachment means which permits pivotal movement of said support arm;
      wherein said support arm has top and bottom ends, and first and second side edges;
      wherein said support arm is contiguous to said outer surface of said bracket at said second end, when in a first, non-operative position; and wherein said support arm extends substantially vertically downwardly from said bracket to the ground in a second, operative position;
      wherein said extension member has first and second ends, and said second end of said extension member is secured against said outer surface of said bracket in the region of one of said first and second side edges; and
      wherein said retractor arm has first and second ends, and wherein said first end of said retractor arm is pivotally and slidably attached to said first end of said extension member, and wherein said second end of said retractor arm is pivotally attached to one of said first and second side edges of said support arm at a point which is intermediate said first and second ends thereof.

2. The load lifting accessory of claim 1, wherein said bracket has a U-shaped cross section so as to embrace the underside of a cylindrical shaft of a shovel.

3. The load lifting accessory of claim 1, wherein said bracket is attached to the shaft of the shovel by attachment means chosen from the group of attachment means consisting of clamps, straps and buckles, and bolts.

4. The load lifting accessory of claim 1, wherein said first end of said retractor arm is pivotally and slidably attached to said first end of said extension member by a pivotal means which has a passage formed therein so as to permit said retractor arm to extend therethrough.

5. The load lifting accessory of claim 1, wherein said support arm is formed from materials chosen from the group of materials consisting of wood, metals and plastics.

6. The load lifting accessory of claim 1, wherein said support arm has two portions, and wherein said two portions are telescopically fitted one over the other so as to permit the length of said support arm to be adjusted.

7. The load lifting accessory of claim 1, wherein said support arm is offset forwardly.

8. The load lifting accessory of claim 1, further comprising a foot member, wherein said foot member is removably attached to said bottom end of said support arm.

9. A load lifting accessory which is adapted to be affixed to the shaft of a shovel, said load lifting accessory comprising:
   a bracket, a support arm, an actuator, and a retractor arm;
      wherein said bracket has inner and outer surfaces, first and second ends, and first and second side edges;
      wherein said bracket is adapted to embrace the underside of the shaft of a shovel when the shovel is oriented in a normal shovelling position, and wherein the underside of the shaft of the shovel, in the region of the midpoint thereof, is rested against said inner surface of said bracket;
      wherein said bracket is attached to the shaft of the shovel by attachment means, and wherein said outer surface of said bracket has said support arm attached thereto by attachment means which permits pivotal movement of said support arm;
      wherein said support arm has top and bottom ends, and first and second side edges;
      wherein said support arm is contiguous to said outer surface of said bracket at said second end, when in a first, non-operative position; and wherein said support arm extends substantially vertically downwardly from said bracket to the ground in a second, operative position;
      wherein said actuator has first and second ends, and first and second sides at the same side of said accessory as said first and second side edges of said support arm;
      wherein said first end of said actuator is pivotally attached to said outer surface of said bracket, in the region between said first end of said bracket and the attachment point of said support arm; and
      wherein said retractor arm has first and second ends, and wherein said first end of said retractor arm is pivotally attached to one of said first and second sides of said actuator, in the region between said first end and the midpoint thereof, and wherein said second end of said retractor arm is pivotally attached to one of said respective first and second side edges of said support arm at a point which is intermediate said first and second ends thereof.

10. The load lifting accessory of claim 9, wherein said bracket has a U-shaped cross section so as to embrace the underside of a cylindrical shaft of a shovel.

11. The load lifting accessory of claim 9, wherein said bracket is attached to the shaft of the shovel by attachment means chosen from the group of attachment means consisting of clamps, straps and buckles, and bolts.

12. The load lifting accessory of claim 9, wherein said support arm is formed from materials chosen from the group of materials consisting of wood, metals and plastics.

13. The load lifting accessory of claim 9, wherein said support arm has two portions, and wherein said two portions are telescopically fitted one over the other so as to permit the length of said support arm to be adjusted.

14. The load lifting accessory of claim 9, wherein said support arm is offset forwardly.

15. The load lifting accessory of claim 9, further comprising a foot member, wherein said foot member is removably attached to said bottom end of said support arm.

* * * * *